(12) United States Patent
Nishimura (10) Patent No.: US 7,631,742 B2
(45) Date of Patent: Dec. 15, 2009

(54) PARKING LOCK DEVICE FOR AUTOMATIC TRANSMISSION

(75) Inventor: Naoki Nishimura, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 158 days.

(21) Appl. No.: 12/014,137

(22) Filed: Jan. 15, 2008

(65) Prior Publication Data

US 2008/0169168 A1     Jul. 17, 2008

(30) Foreign Application Priority Data

Jan. 15, 2007    (JP) .............................. 2007-006099

(51) Int. Cl.
*B60T 1/06* (2006.01)
*F16H 63/34* (2006.01)

(52) U.S. Cl. ...................... 192/219.5; 74/411.5; 188/31

(58) Field of Classification Search ............... 192/219.5
See application file for complete search history.

(56) References Cited

U.S. PATENT DOCUMENTS 3,642,100 A * 2/1972 Travis .......................... 188/69
5,954,179 A * 9/1999 Osborn ..................... 192/219.5

FOREIGN PATENT DOCUMENTS

| JP | 62-218261 A | 9/1987 |
|----|-------------|--------|
| JP | 05-004565 A | 1/1993 |
| JP | 9-240442 A  | 9/1997 |
| JP | 9-267726 A  | 10/1997 |
| JP | 11-037290 A | 2/1999 |

* cited by examiner

*Primary Examiner*—Richard M. Lorence
(74) *Attorney, Agent, or Firm*—Sughrue Mion, PLLC (57) ABSTRACT

A parking lock device for an automatic transmission includes: a parking gear externally fixed to the output shaft; a parking lock pole displaced between a lock position, where the parking lock pole latches onto the parking gear to disable rotation of the parking gear, and an unlock position, where the parking lock disengages from the parking gear to enable rotation of the parking gear; a parking rod for displacing the parking lock pole toward and away from the parking gear; a drive lever that moves the parking rod; and a booster mechanism interposed between the parking rod and the drive lever that increases the driving force of the drive lever. Thus, the parking lock device makes the driving force applied by the drive lever when unlocking as small as possible and prevents inadvertent unlocking when in a locked state, thereby achieving smooth operation and enhanced reliability.

2 Claims, 11 Drawing Sheets

PARKING LOCK DEVICE FOR AUTOMATIC TRANSMISSION

INCORPORATION BY REFERENCE

The disclosure of Japanese Patent Application No. 2007-006099 filed on Jan. 15, 2007 including the specification, drawings and abstract is incorporated herein by reference in its entirety.

BACKGROUND OF THE INVENTION

1. Field of Invention

The present invention relates to a parking lock device for an automatic transmission for a vehicle. The parking lock device causes a pawl of a parking lock pole to latch onto a parking gear, which is externally fixed to an output shaft of an automatic transmission, to lock and prevent rotation of the output shaft, and disengages the pawl from the parking gear to unlock and allow rotation of the output shaft.

2. Description of Related Art

In an automatic transmission for a vehicle, generally, a parking range (P), a reverse range (R), a neutral range (N), a drive range (D), and the like are set as the selectable shift ranges.

For instance, such an automatic transmission has a parking lock device for bringing the output shaft of the automatic transmission into a non-rotatable locked state when the parking range P is selected with a shift lever installed near the driver's seat of the vehicle (see, for example, Japanese Patent Application Publication No. 62-218261 (JP-A-62-218261), Japanese Patent Application Publication No. 9-267726 (JP-A-9-267726), and Japanese Patent Application Publication No. 9-240442 (JP-A-9-240442)).

This parking lock device includes a parking gear, a parking rod, a parking lock pole, and a drive lever.

Operation of the parking lock device will be described. First, when the parking rod is pushed to one side in its axial direction to tilt the parking lock pole, and the pawl of this parking lock pole is latched onto the parking gear externally fixed to the output shaft, the output shaft is brought into a non-rotatable locked state.

Further, when the parking rod is pulled to the other side in its axial direction to tilt the parking lock pole in a direction opposite to the above-mentioned direction, and the pawl of the parking lock pole is disengaged from the parking gear, the output shaft is brought into a rotatable unlocked state.

It should be noted that the parking rod is pushed or pulled in the axial direction by the drive lever that is tilted in response to an operation of placing the shift lever into the parking range or an operation of releasing the shift lever from the parking range. This parking rod is directly connected to a predetermined portion of the drive lever.

As the drive lever of this parking lock device, some related art devices use, for example, the manual valve lever of a range selector (see, for example, Japanese Patent Application Publication No. 9-267726 (JP-A-9-267726)).

The range selector is generally configured as follows. That is, when the shift lever installed near the driver's seat of the vehicle is operated by the driver, the manual valve lever is tilted. The state of a manual valve, which is a constituent element of a hydraulic controller for switching shift ranges, is changed in accordance with this tilting movement of the manual valve lever, thereby establishing the shift range selected by the above-mentioned shift change operation.

It should be noted that as the mode of power transmission between the manual valve lever and the shift lever, there is a type in which power is directly transmitted by mechanically coupling and connecting the manual valve lever and the shift lever by using a power transmission member such as a shift rod or shift cable, or the like, and a type in which the shift lever and the manual valve lever are not connected together by the power transmission member but are detached from each other, and when the shift lever is operated by the driver of the vehicle, the position of the selected shift range is detected by a sensor or the like, and the manual valve lever is driven by an actuator such as a motor so as to establish the detected shift range.

The above-mentioned related art still leaves room for improvements in the following respects.

As a general tendency, when a vehicle is stopped on a downhill slope, the same forward rotation torque as that at the time of forward movement is input to the output shaft from the driving wheels, whereas when the vehicle is stopped on an uphill slope, reverse rotation torque is input to the output shaft from the driving wheels.

When, in a state with the parking lock device locked, the above-mentioned forward rotation torque is input to the output shaft, this makes the pawl of the parking lock pole prone to disengage from the parking gear. In this case, the driving force of the manual valve lever (drive lever) required for bringing the parking lock device into an unlocked state can be made relatively small.

On the other hand, when, in a state with the parking lock device locked, the above-mentioned reverse rotation torque is input to the output shaft, the pawl of the parking lock pole bites into the parking gear. In this case, the driving force of the manual valve lever (drive lever) required for bringing the parking lock device into an unlocked state needs to be made relatively large.

However, since this phenomenon is established on the basis of the positional arrangement of the tilting axis of the parking lock pole with respect to the parking gear, if this positional arrangement differs, a phenomenon reverse to that mentioned above is established.

In view of the phenomenon as described above, generally, the engaging force or the like of a latch lever with each position groove of the manual valve lever is adjusted to allow suitable setting of the driving force of the manual valve lever required for achieving the above-mentioned unlocked state.

From the viewpoint of safety, this setting is desired to ensure that unlocking does not easily occur. However, in that case, the driving force to be applied by the drive lever at the time of unlocking needs to be set large, resulting in an increase in the requisite operation force of the shift lever.

In contrast, although it may be possible to use assist means such as a motor for facilitating the unlocking operation, this leads to an increase in equipment cost.

SUMMARY OF THE INVENTION

The present invention provides a parking lock device that locks the output shaft of an automatic transmission in a manner that prevents or allows rotation of the output shaft, as appropriate, and, by means of a simple configuration, minimizes the driving force that is applied by the drive lever when unlocking, and also prevents inadvertent unlocking when the output shaft is locked, thereby achieving smooth operation and enhanced reliability.

According to one aspect of the present invention, there is provided a parking lock device which brings an output shaft of an automatic transmission into a non-rotatable locked state or a rotatable unlocked state as required, the parking lock device includes: a parking gear externally fixed to the output shaft; a parking lock pole displaced between a lock position, where the parking lock pole approaches and latches onto the parking gear to thereby disable rotation of the parking gear, and an unlock position, where the parking lock pole separates and disengages from the parking gear to thereby enable rotation of the parking gear; a parking rod pushed and pulled to displace the parking lock pole toward or away from the parking gear; a drive lever supported in a tiltable manner that pushes or pulls the parking rod in a longitudinal direction of the parking rod; and a booster mechanism interposed between the parking rod and the drive lever, that increases a driving force of the drive lever applied when locking or unlocking the parking lock device and converts the driving force into a pressing force or a pulling force on the parking rod.

According to this configuration, the use of the booster mechanism increases the pressing force or pulling force on the parking rod even when the driving force applied by the drive lever when locking or unlocking the parking lock device is small. Accordingly, the parking lock device can be easily and reliably locked or unlocked with a relatively small force.

Therefore, the driving force of the drive lever required when stopping a vehicle on a uphill slope or a downhill slope to lock or unlock the parking lock device may be minimized.

Furthermore, the overall configuration is simple, which only involves interposing a mechanical booster mechanism between the driver lever and the parking rod. This is advantageous in reducing equipment cost as compared with a case where power assist means such as an expensive motor is equipped as described in the related art.

The booster mechanism may include a link which pivots about a position in the driver lever separated from a tilting axis and on one end of the parking rod. When the drive lever is tilted to a locking side, the link is positioned so that the link is aligned in a straight line with the parking rod and pushes the parking rod in the manner of a strut, and when the drive lever is tilted to an unlocking side, the link is positioned so that the link is inclined at a predetermined angle with respect to the parking rod and pulls the parking rod.

According to this configuration, the link and the drive lever constitute a toggle joint type booster mechanism.

In the booster mechanism as described above, due to the tilting movement of the drive lever, a tangential force (equivalent to a driving force) acts on the joint portion between the drive lever and the link, and the tangential force is increased by the boosting action and converted into a pressing force or pulling force that acts on the parking rod at the joint portion between the link and the parking rod.

This increases the pressure force or pulling force on the parking rod even when the tangential force, that is, the driving force of the drive lever, is small.

The booster mechanism may further include: a fixed link attached at both ends to a tilting axis and a position separated from the tilting axis in the drive lever; a movable link which is pivoted on the position in the driver lever separated from the tilting axis and on one end of the parking rod, and which, when the fixed link is tilted to the locking side integrally with the drive lever, is positioned so that the movable link is aligned in a straight line with the parking rod and pushes the parking rod in the manner of a strut, and when the fixed link is tilted to the unlocking side integrally with the drive lever, is positioned so that the movable link is inclined at a predetermined angle with respect to the parking rod and pulls the parking rod; a connecting bar whose both ends are engaged with elongated guide holes respectively provided in the fixed link and the movable link so as to extend between their both ends; and a stopper that prevents the fixed link and the movable link from bending opposite to an unlocking side in a state when the fixed link, the movable link, and the parking rod are aligned in a straight line.

According to this configuration, the two links constitute the booster mechanism of a toggle joint type. Thus, in the same manner as mentioned above, it is possible to increase the pressure force or pulling force on the parking rod even when the tangential force, that is, the driving force of the drive lever is small.

In addition, the movements of the two links are coordinated with each other by the connecting bar, thereby making the movements of the links smooth. Further, the stopper provides enhanced reliability of operation, such as by preventing the two links arranged in a straight line from bending inadvertently to the side opposite to the unlocking side.

Further, the ends of the elongated guide hole in the fixed link and of the elongated guide hole in the movable link, which are located near each other, may be extended so as to be offset to a side opposite to the unlocking side with respect to a line connecting the tilting axis of the drive lever and a pivot point at which the movable link is pivoted on the one end of the parking rod, in the state when the fixed link, the movable link, and the parking rod are aligned in a straight line.

According to this configuration, if, conversely to the normal operation, an axial load is applied toward the movable link from the parking rod, moments act to move the joint portions of the links to the stopper side.

Due to this operating principle, it is possible to keep the links aligned in a straight line and prevent the links from becoming unlocked as a result of bending.

With the parking lock device according to the present invention, it is possible, by means of a simple configuration, to make the driving force to be applied by the drive lever when shifting to an unlocked state as small as possible and prevent inadvertent unlocking when in a locked state. This makes it possible to achieve smooth operation and enhanced reliability of the parking lock device.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 10A to 10D are views illustrating the operation of the booster mechanism shown in FIG. 3, of which

DETAILED DESCRIPTION OF THE PREFERRED EMBODIMENTS

An embodiment of the present invention will be described below with reference to the drawings. FIGS. 1 to 15 show an embodiment of the present invention.

Before describing a portion to which features of the present invention are applied, an overview of an example of an automatic transmission to which a parking lock device according to the present invention is to be applied will be described with reference to FIGS. 1 and 2.

Figure 1:
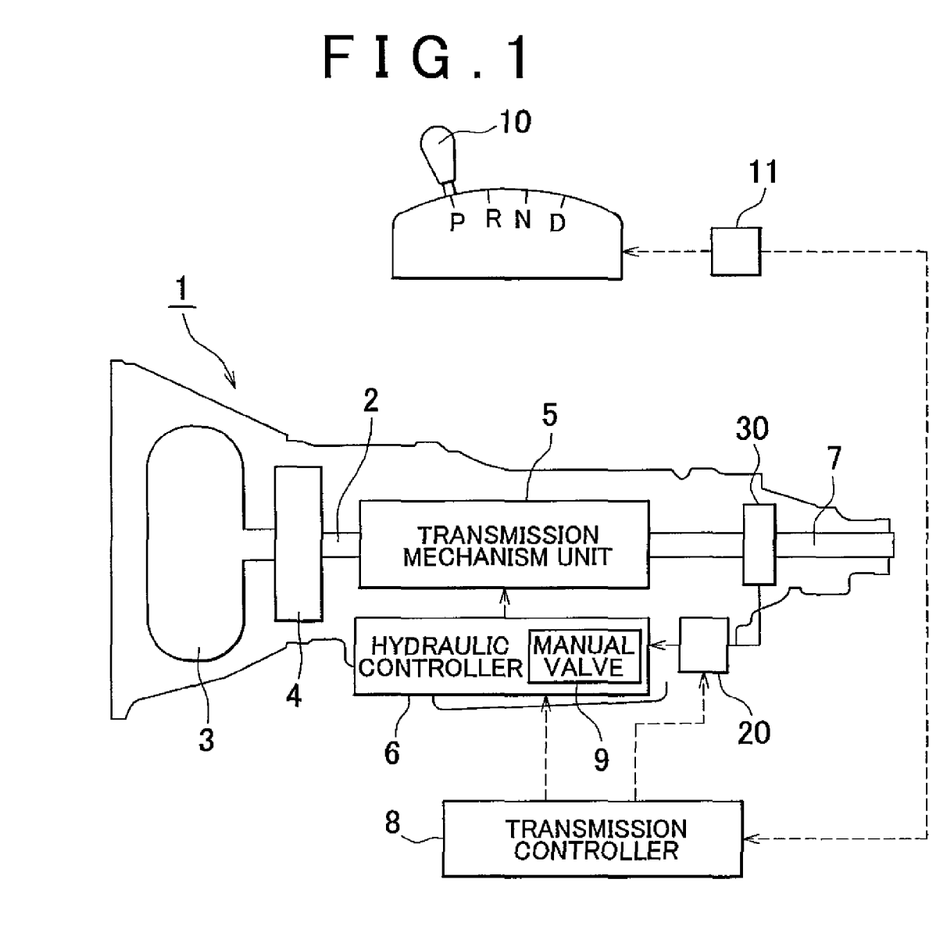
FIG. 1 is a schematic diagram showing an example of an automatic transmission to which a parking lock device according to the present invention is applied.
Figure 2:
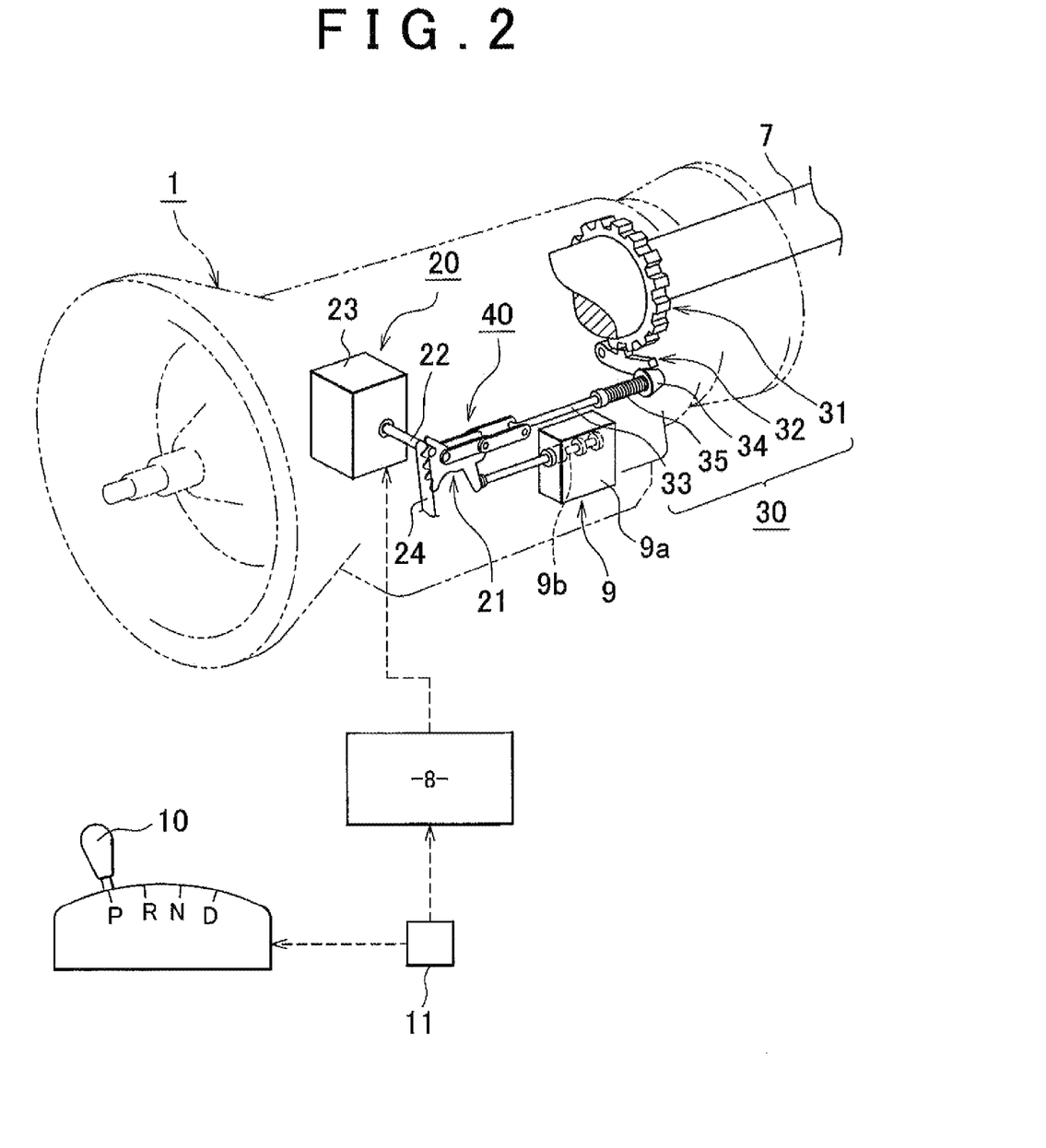
FIG. 2 is a perspective view showing a range selector device and the parking lock device shown in FIG. 1.

FIG. 1 is a schematic diagram of an automatic transmission to which the present invention is to be applied, and FIG. 2 is a perspective view showing a range selector and a parking lock device shown in FIG. 1.

In these figures, reference numeral 1 denotes an automatic transmission for a front-engine, rear-drive (FR) vehicle.

As shown in FIG. 1, the automatic transmission 1 mainly includes an input shaft 2, a torque converter 3, an oil pump 4, a transmission mechanism unit 5, a hydraulic controller 6, an output shaft 7, and the like. A transmission controller 8 controls the gear changes in the automatic transmission 1.

The operation of the automatic transmission 1 can be summed up as follows. When the rotation of a crankshaft (not shown) of the engine 1 is input to the input shaft 2 via the torque converter 3, the speed of the rotation input to the input shaft 2 is changed at a suitable gear ratio by the transmission mechanism unit 5 before being output from the output shaft 7.

Although not illustrated in detail, the transmission mechanism unit 5 is configured by, for example, a plurality of planetary mechanisms. Alternatively, the transmission mechanism unit 5 can be configured as, for example, a gear mechanism having a plurality of gears, a continuously variable transmission mechanism called CVT, or the like.

The hydraulic controller 6 controls the gear change operation of the transmission mechanism unit 5 described above. Although not illustrated in detail, the hydraulic controller 6 includes at least a plurality of linear solenoid valves for controlling engaging operations of various brakes and clutches used in the transmission mechanism unit 5, and a manual valve 9 for supplying hydraulic fluid to the respective linear solenoid valves as required.

The manual valve 9 supplies hydraulic fluid to each linear solenoid valve as appropriate from a suitable port in order to establish a neutral range N, a drive range D, or a reverse range R in accordance with an operation of a shift lever 10 by the driver.

The shift lever 10 is installed near the driver's seat of a vehicle, and is manually operated and placed into an arbitrary shift range (parking range P, reverse range R, neutral range N, or drive range D).

The manual valve 9 is configured as a so-called spool valve, and includes a valve body 9a having various feed ports and exhaust ports (not shown), and a spool 9b accommodated in the valve body 9a so as to be axially displaceable. The valve body 9a is fixed to the case of the automatic transmission 1.

The manual valve 9 displaces the spool 9b to one side or the other in the axial direction of the spool 9b to position the spool 9b at a predetermined position, thereby establishing the parking range P, the reverse range R, the neutral range N, or the drive range D as appropriate.

Further, the above-described automatic transmission 1 is equipped with a range selector 20 and a parking lock device 30.

Figure 3:
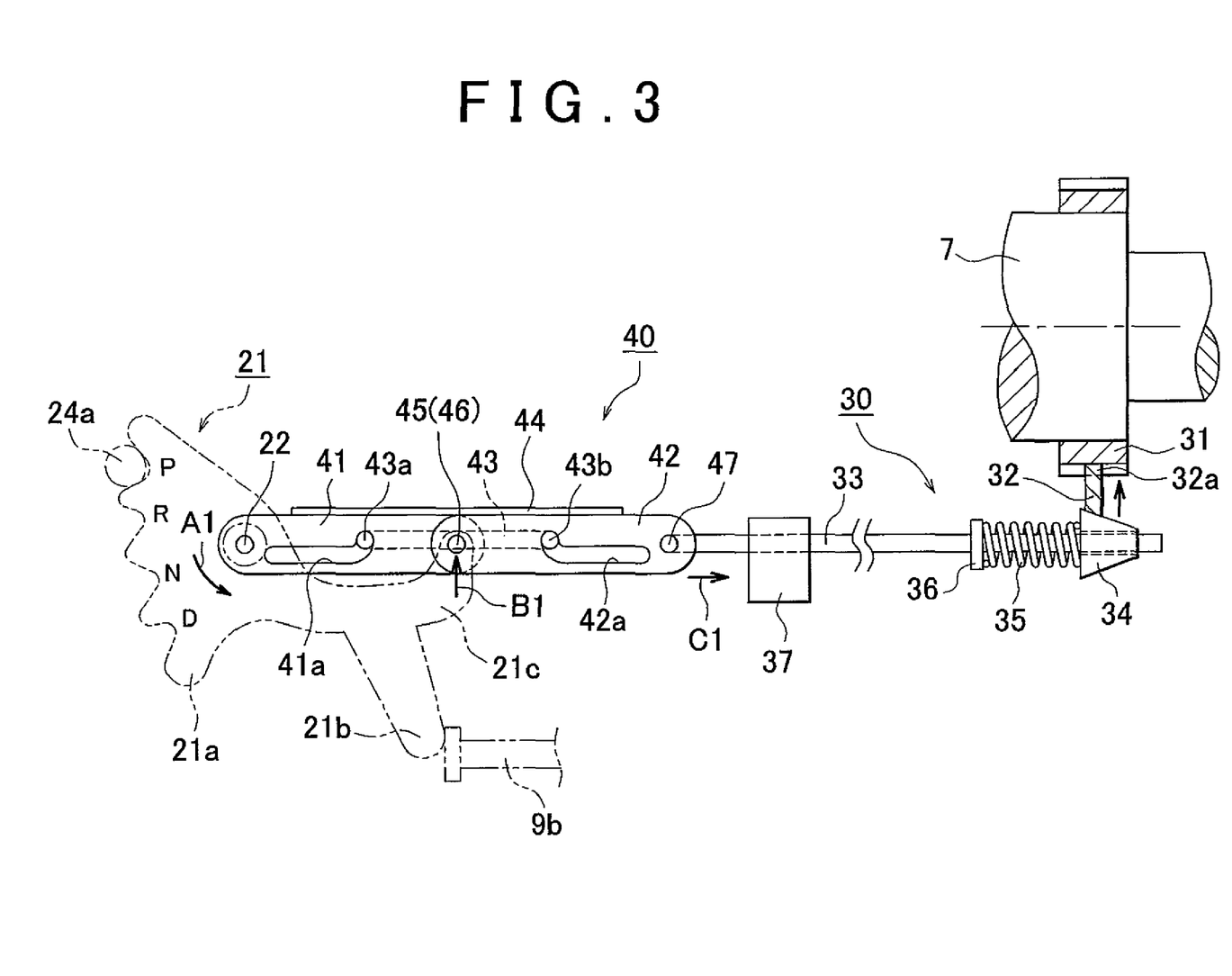
FIG. 3 is a side view showing the parking lock device shown in FIG. 2, illustrating a locked state.

The range selector 20 changes the state of the manual valve 9 of the above-described hydraulic controller 6 in order to establish a gear position (such as the parking range P, the reverse range R, the neutral range N, or the drive range D) of the automatic transmission 1 corresponding to a shift range selected by the shift lever 10, for example. As shown in FIGS. 2 and 3, the range selector 20 mainly includes a manual valve lever 21, a shift control shaft 22, an actuator 23, and a latch lever 24.

The manual valve lever 21 may be titled in, for example, four steps in coordination with shift ranges (the parking range P, the reverse range R, the neutral range N, and the drive range D) selected by the shift lever 10. The manual lever 21 axially displaces the spool 9b of the manual valve 9 in accordance with its tilt position.

Figure 4:
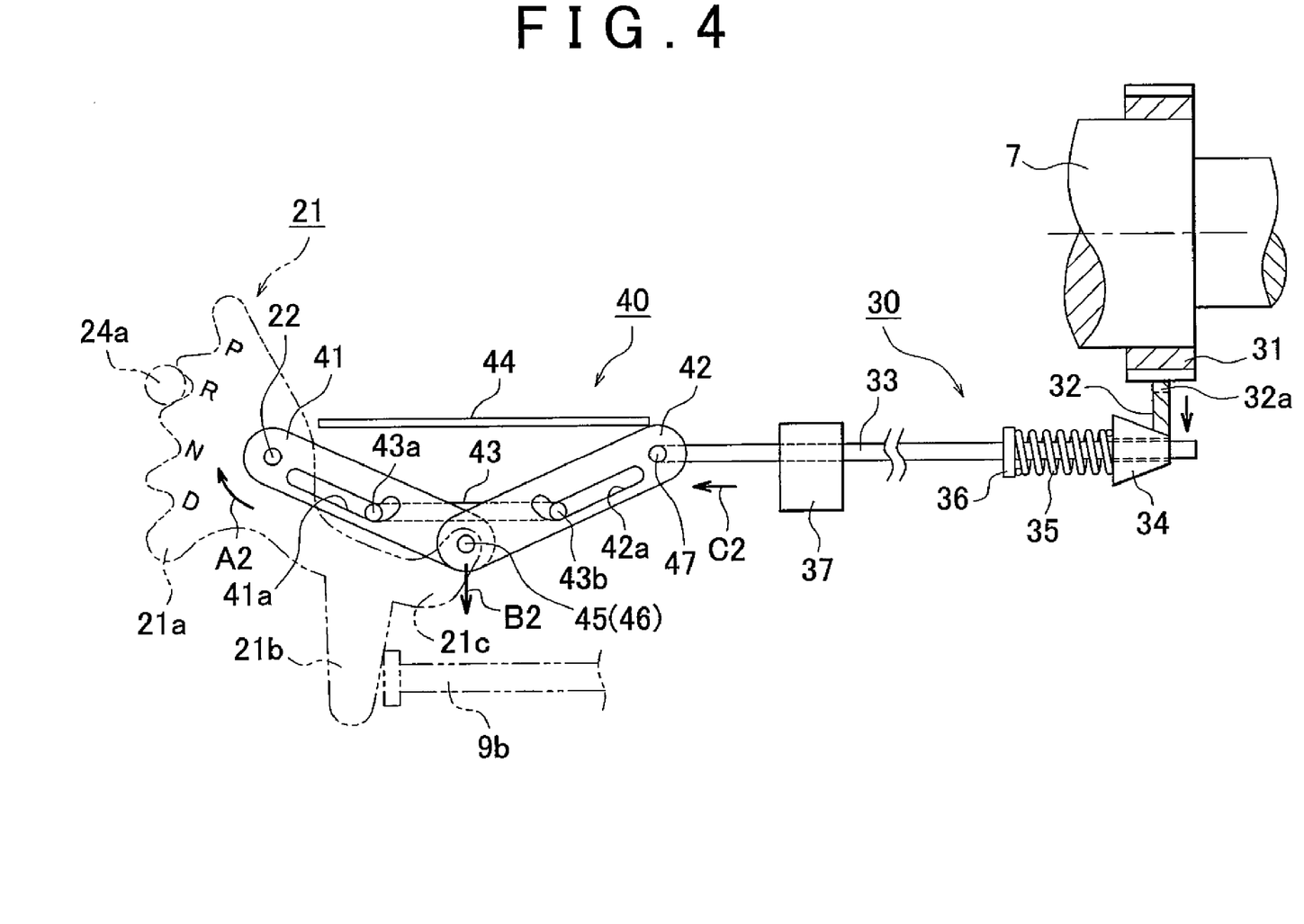
FIG. 4 is a side view showing the parking lock device shown in FIG. 2, illustrating an unlocked state.

Corrugated grooves are provided on one end side 21a of the manual valve lever 21. The corrugated grooves include the number of grooves (four grooves) corresponding to the four shift positions (the parking range P, the reverse range R, the neutral range N, and the drive range D) of the shift lever 10. As shown in FIGS. 3 and 4, for example, marks "P, R, N, D" are written near the four grooves.

The front end of the spool 9b of the manual valve 9 is joined to the other end side 21b of the manual valve lever 21. The front end of a parking rod 33 of the parking lock device 30 abuts against a projection member 21c.

When the manual valve lever 21 is tilted as appropriate, the spool 9b is axially displaced to advance and retract, thereby establishing the parking range P, the reverse range R, the neutral range N, or the drive range D.

The manual valve lever 21 is integrally joined to one end of the shift control shaft 22.

The shift control shaft 22 is rotatably supported on the case or the like of the automatic transmission 1, and is rotationally driven in a suitable direction by the actuator 23.

Although not illustrated in detail, the actuator 23 includes, for example, a suitable motor and reduction gear mechanism (warm gear or the like). The transmission controller 8 controls the operation of the actuator 23.

The latch lever 24 maintains the four tilt positions of the manual valve lever 21 individually. The latch lever 24 has, at the other end of its main body made of a leaf spring or the like whose one end is fixed to the case of the automatic transmission 1, a pin 24a that is engaged with one of the corrugated grooves in a sector arm 21a of the manual valve lever 21.

The transmission controller 8 is configured as a commonly known ECU (Electronic Control Unit). For example, the transmission controller 8 detects the position of the shift lever 10 by a range position sensor 11, and drives the actuator 23 to control the hydraulic controller 6, thereby establishing a suitable gear position, that is, a power transmission path in the transmission mechanism unit 5.

The range position sensor 11 detects the range position, parking range (P), the reverse range (R), the neutral range (N), the drive range (D), and the like in which the shift lever 10 is placed.

Next, a gear change operation will be briefly described. For example, when the shift lever 10 is operated by the driver, the selected range is detected by the shift position sensor 11, and on the basis of the detected range position, the transmission controller 8 rotationally drives the actuator 23 in a suitable direction, thus causing the shift control shaft 22 and the manual valve lever 21 integrated with the shift control shaft 22 to rotate, that is, to tilt by a predetermined angle.

This tilting of the manual valve lever 21 causes the spool 9*b* of the manual valve 9 to slide, and the manual valve 9 of the hydraulic controller 6 is switched to a range selected from "P", "R", "N", and "D", so a suitable gear position is established within the transmission mechanism unit 5.

The manual valve lever 21 is set and held in position as the pin 24*a* of the latch lever 24 engages with an arbitrary groove in its sector arm 21*a*.

Figure 5:
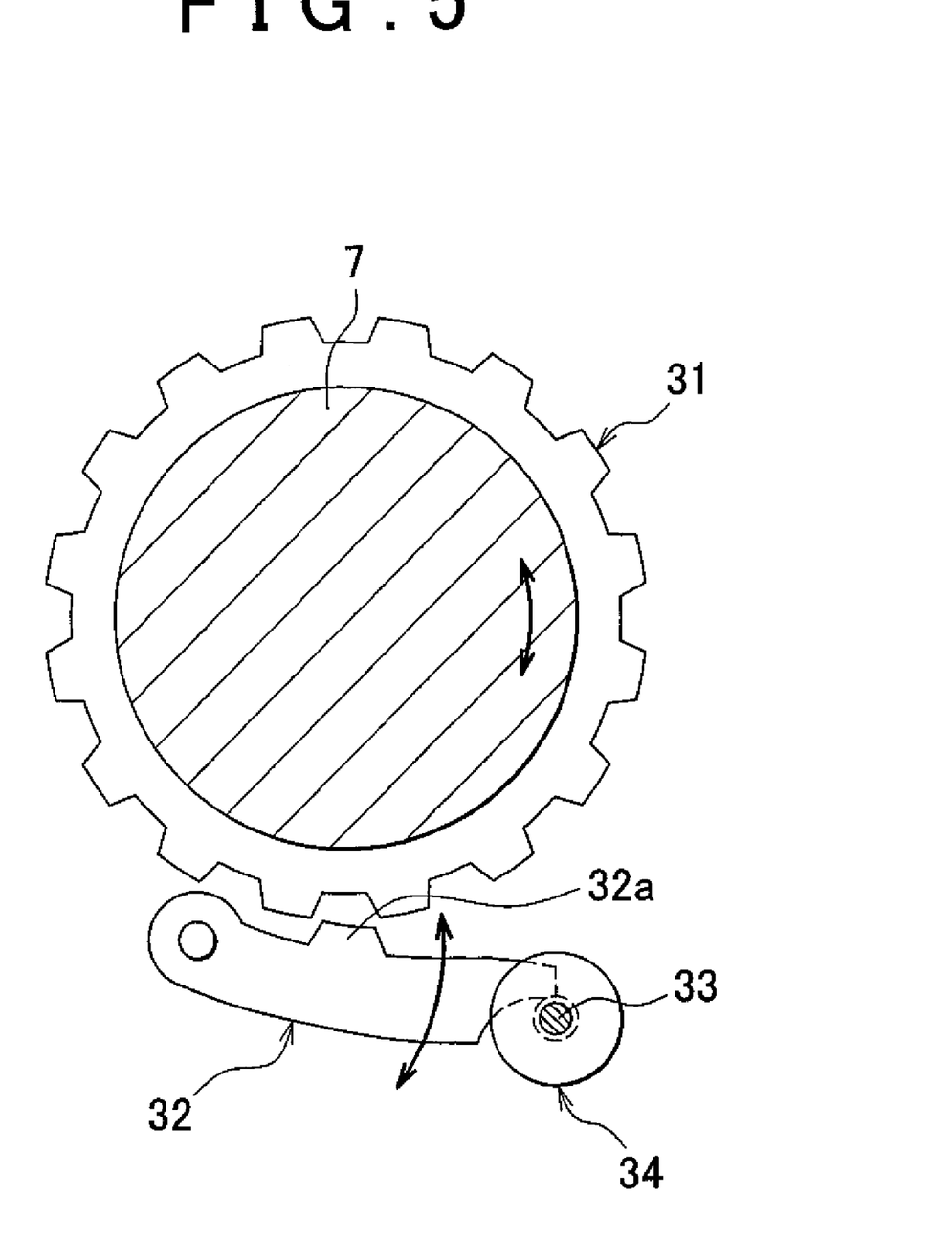
FIG. 5 is a front view showing the relative position of a parking gear with a parking lock pole of the parking lock device shown in FIG. 4.
Figure 6:
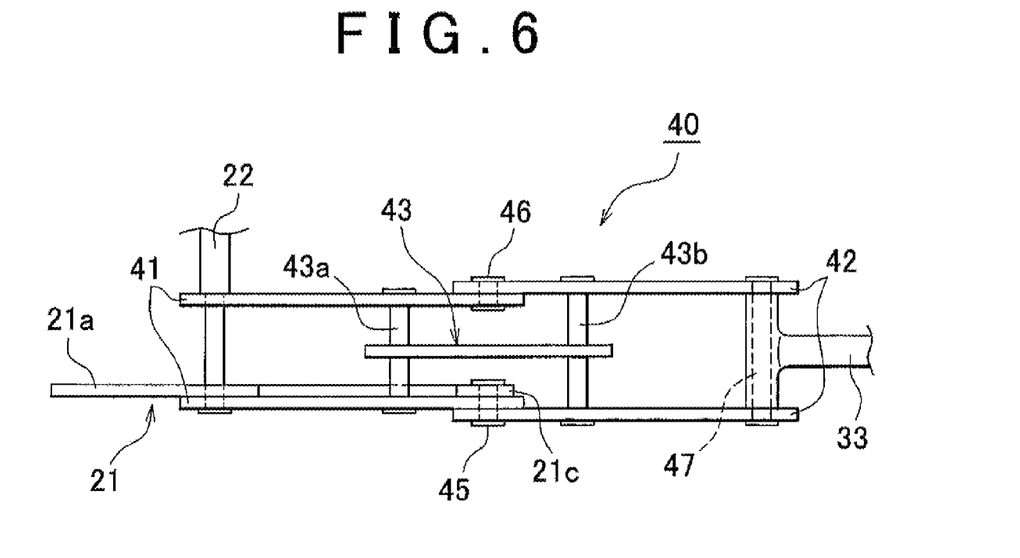
FIG. 6 is a plan view showing a booster mechanism shown in FIG. 3.

Next, the basic configuration of the parking lock device 30 according to an embodiment of the present invention will be described in detail with reference to FIGS. 3 to 5.

The parking lock device 30 disables rotation of the output shaft 7 of the automatic transmission 1 when the driver selects the parking range P with the shift lever 10. The parking lock device 30 basically includes a parking gear 31, a parking lock pole 32, and the parking rod 33.

The parking gear 31 is externally fixed to the output shaft 7, and the parking lock pole 32 is arranged near the parking gear 31 so that the lock pole 32 is able to tilt on its one end side as an axis. Provided at a halfway position in the longitudinal direction of the parking lock pole 32 is a pawl 32*a* that is fit into or detached from between teeth of the parking gear 31.

The parking rod 33 may be displaced toward its front end or its rear end substantially in parallel with the output shaft 7 due to tilting movement of the manual valve lever 21 that serves as a tilting lever.

The front end of the parking rod 33 is connected to the manual valve lever 21 via a booster mechanism 40 described later. A taper cone 34 for allowing the parking lock pole 32 to tilt is provided at the rear end of the parking rod 33.

It should be noted that reference numeral 35 denotes a coil spring for pressing the taper cone 34 to the parking gear 31 side, and reference numeral 36 denotes a snap ring that is latched and fixed onto the parking rod 33 and receives one end of the coil spring 35. Reference numeral 37 denotes a guide for guiding the axial displacement of the parking rod 33.

The basic operation of the parking lock device 30 will be described.

First, when the manual valve lever 21 is tilted into a position as shown in FIG. 3, the parking rod 33 is pushed toward the rear, and the large-diameter-side portion of the taper cone 34 pushes the parking lock pole 32 upwards so that its pawl 32*a* is inserted in between the teeth of the parking gear 31. As a result, the output shaft 7 is non-rotatably locked in this state.

On the other hand, when the manual valve lever 21 is tilted into a position as shown in FIG. 4, the parking rod 33 and the taper cone 34 are pulled toward the front, and the force with which the parking lock pole 32 is pushed up by the taper cone 34 is released. Accordingly, the parking lock pole 32 moves downwards, and its pawl 32*a* comes out from between the teeth of the parking gear 31. As a result, the output shaft 7 is unlocked and able to rotate.

Now, the portion to which the features of the present invention is applied to the parking lock device 30 described above will be described in detail with reference to FIGS. 3 to 15.

First, to unlock the parking lock device 30, the manual valve lever 21 is tilted. In this regard, a contrivance is made to make the requisite driving force at this time as small as possible while preventing inadvertent unlocking when in a locked state.

Specifically, the booster mechanism 40 is interposed between the front end of the parking rod 33 and the manual valve lever 21.

The booster mechanism 40 is a toggle joint type booster mechanism, and mainly includes a fixed link 41, a movable link 42, a connecting bar 43, and a stopper 44.

The fixed link 41 and the movable link 42 are each made of a two-ply strip plate, and are arranged adjacent to each other at a predetermined spacing with respect to the thickness direction. Further, the fixed link 41 and the movable link 42 are connected together at pivots 45 and 46 with the other end of the fixed link 41 and one end of the movable link 42 overlapped with each other. The other end of the fixed link 41 is thus pivoted on one end of the movable link 42.

In the body portions of the links 41 and 42, elongated guide holes 41*a* and 42*a* are respectively provided so as to penetrate the body portions in the thickness direction and extend in the longitudinal direction. The shape of the elongated guide holes 41*a* and 42*a* will be described later in detail.

The connecting bar 43 has guide pins 43*a* and 43*b* integrally provided at each end of the connecting bar 43 of a single stripe, respectively. The guide pins 43*a* and 43*b* of the connecting bar 43 are respectively inserted in the elongated guide holes 41*a* and 42*a* of the links 41 and 42 with some play. The connecting bar 43 coordinates the movements of the links 41 and 42 to each other, thereby making the movements of the links 41 and 42 smooth.

The stopper 44 plays the following role. That is, in a state with the links 41 and 42 aligned so as to be continuous in a straight line, that is, when the parking lock device 30 is brought into a locked state, the stopper 44 prevents the links 41 and 42 from being inadvertently bent to the opposite to the unlocking side under an excessive momentum while keeping the links 41 and 42 arranged in a straight line. As such, the stopper 44 functions as a support plate or the like fixed to the case or the like of the automatic transmission 1.

The fixed link 41 is integrally fixed to the manual valve lever 21. Specifically, one end of the fixed link 41 is attached to the shift control shaft 22 serving as the tilting axis of the manual valve lever 21, and the pivot 45 on the other end side of the fixed link 41, that is, on the side connected to the movable link 42, is attached to the projection member 21*c* of the manual valve lever 21.

The front end of the parking rod 33 is attached to the other end of the movable link 42 via a pivot 47. The other end of the movable link 42 is thus pivoted on the front end of the parking rod.

Figure 9:
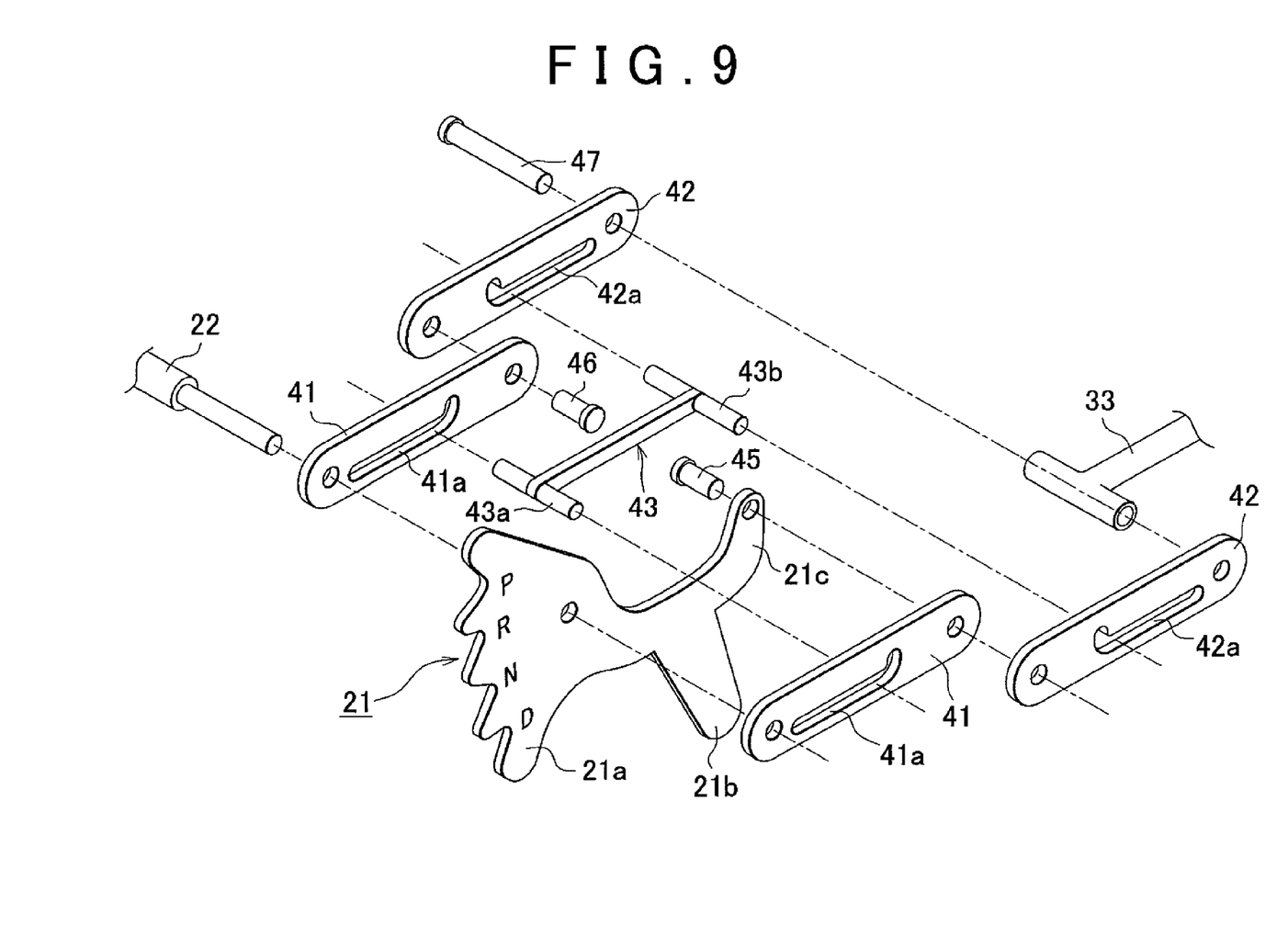
FIG. 9 is an exploded perspective view of the booster mechanism shown in FIG. 3.

Prior to assembly, the above-described pivots 45, 46, and 47 are each formed as, for example, a pin having a flange provided at one end. After the pin is passed through through-holes of the members to be connected together while leaving a predetermined gap as shown in FIG. 9, the distal end of the pin is caulked to form a flange, thereby preventing detachment. Further, the distal end of the shift control shaft 22, and both ends of the guide pins 43*a* and 43*b* of the connecting bar 43 are also each assembled and caulked to form a flange in the same manner as mentioned above. It should be noted, however, the connecting structures may be fastened using a bolt and nut arrangement.

The position of the booster mechanism 40 may be changed as shown in FIG. 3, where the fixed link 41 and the movable link 42 are aligned in a straight line, or as shown in FIG. 4, where they are bent to form a V-shape, as the fixed link 41 integrally attached to the manual valve lever 21 changes its position following the tilting movement of the manual valve lever 21.

The shape and placement of the elongated guide holes 41a and 42a of the links 41 and 42 are designed to prevent the links 41 and 42 from easily bending in a V-shape when an axial load is input from the parking rod 33 while the links 41 and 42 are aligned in a straight line. These arrangements will be described below with reference to FIG. 7.

Figure 7:
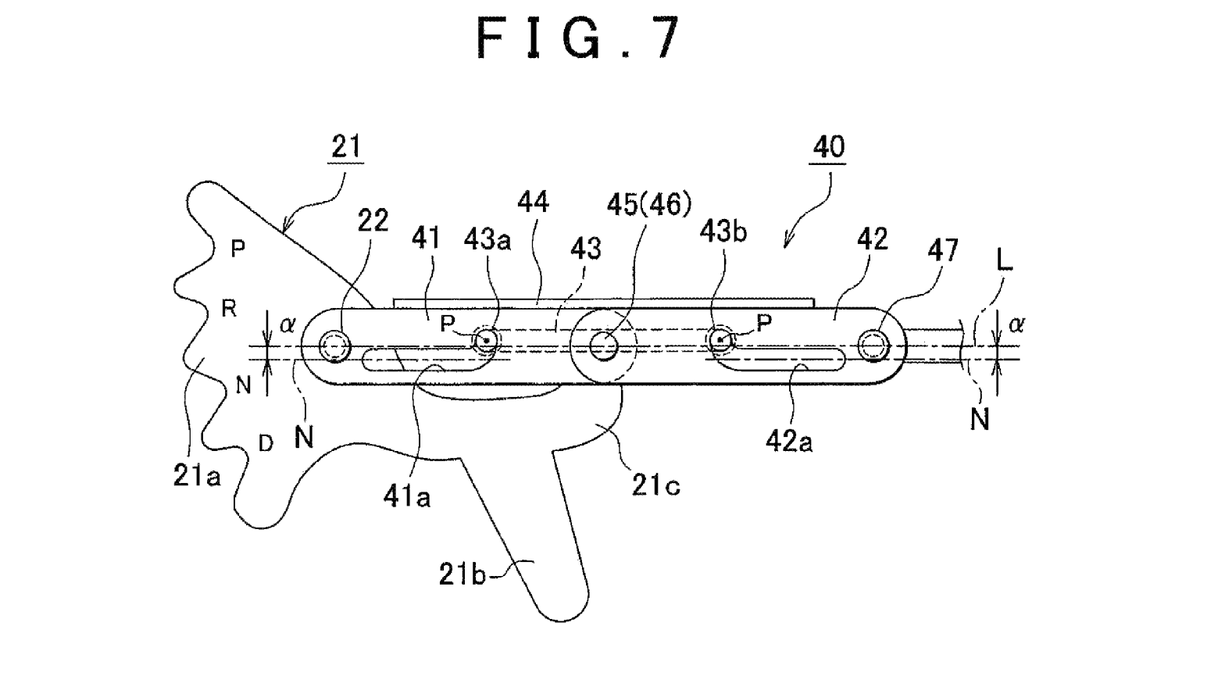
FIG. 7 is an enlarged side view showing the booster mechanism shown in FIG. 3.
Figure 8:
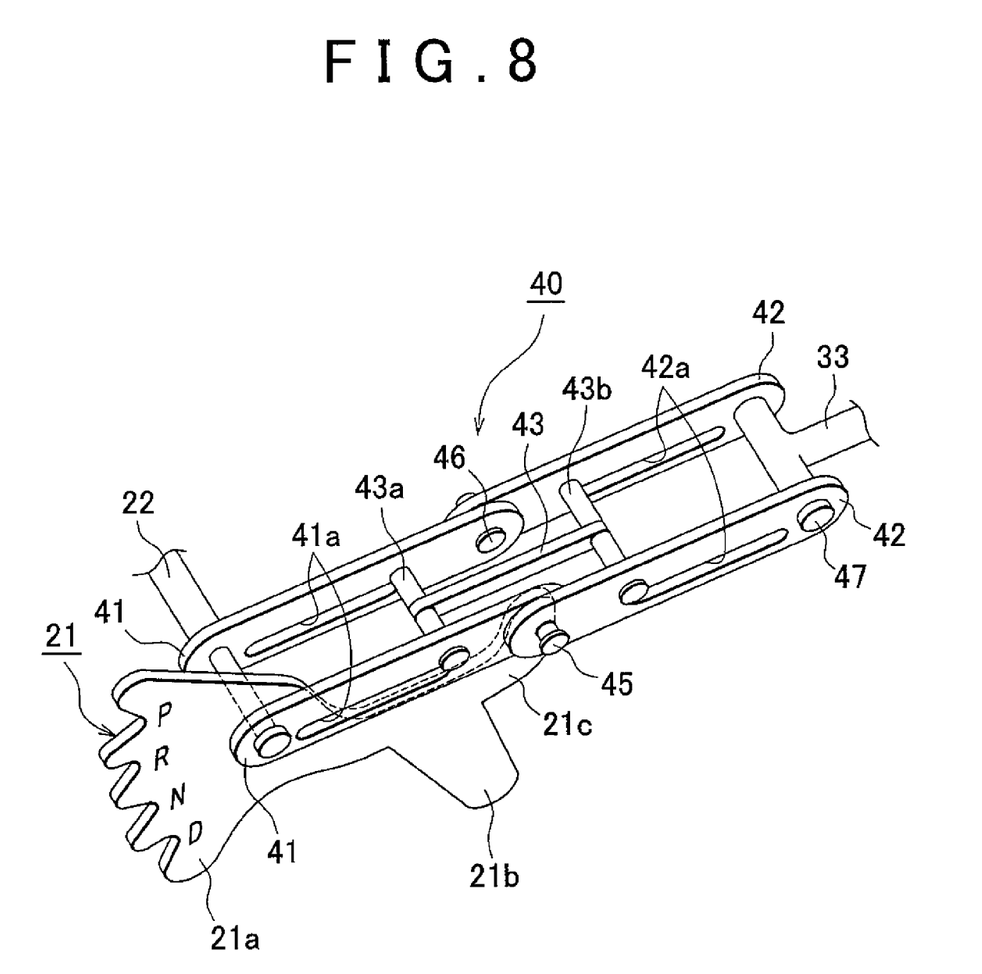
FIG. 8 is an enlarged perspective view showing the booster mechanism shown in FIG. 3.

First, the elongated guide holes 41a and 42a of the links 41 and 42 extend in a direction orthogonal to the longitudinal direction at the ends positioned close to each other. The elongated guide holes 41a and 42a are thus formed in a substantially L-shape.

Further, the centerline N of each of the elongated linear portions of the elongated guide holes 41a and 42a is arranged so as to be offset toward the unlocking side (side opposite to the stopper 44) by a predetermined amount a, with respect to each of the centerlines L of the fixed link 41 and movable link 42 that extend continuously in a single line in a state with the fixed link 41 and the movable link 42 aligned in a straight line with the parking rod 33.

Further, the extended ends of the elongated guide holes 41a and 42a are extended to a position where, when the guide pins 43a and 43b are arranged at the extended ends, the centers P of the guide pins 43a and 43b are offset to the side opposite to the unlocking side (stopper 44 side) with respect to the centerline L.

With the elongated holes 41a and 42a formed as described above, if, as shown in FIG. 11, an axial load Fa is applied from the parking rod 33 toward the movable link 42, moments M1 and M2 act on the links 41 and 42, which cause pivoted portions (45 and 46) of the links 41 and 42 to move toward the stopper 44, respectively. It should be noted that the axial load Fa is generated as a reaction force from the parking rod 33 when a ratcheting operation is performed to move the shift lever 10 from the drive range D into the parking range P, for example.

Figure 11:
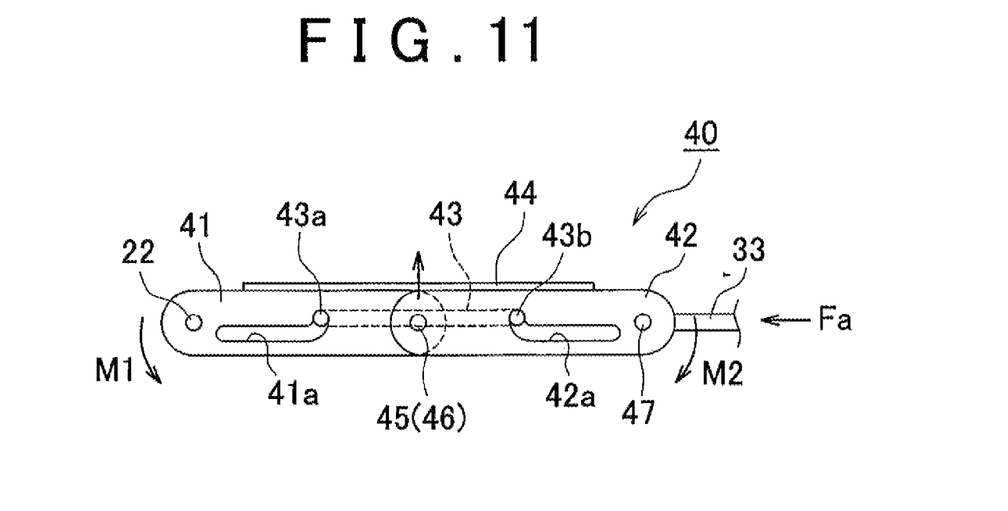
FIG. 11 is a view illustrating the force for holding a locked state applied by the booster mechanism shown in FIG. 10A.

Due to this operating principle, it is possible to keep the links 41 and 42 aligned in a straight line while preventing the links 41 and 42 from easily bending to the unlocking side.

Next, the operation of the parking lock device 30 when the above-described booster mechanism 40 is provided will be described, with reference to FIGS. 3, 4, and 10.

First, for example, when the shift lever 10 is moved from the drive range D to the parking range P, as shown in FIG. 3, the shift control shaft 22 and the manual valve lever 21 are tilted in the arrow A1 direction (counterclockwise direction) in the drawing by the actuator 23 as described above. The pin 24a of the latch lever 24 is thus engaged with the parking position groove of the manual valve lever 21.

Figure 10A:
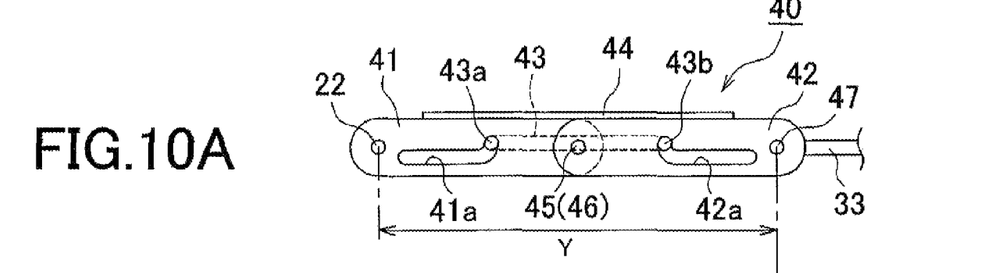
FIG. 10A shows operation for a parking range P.

Simultaneously, the fixed link 41 is tilted in the same direction integrally with the tilting movement of the manual valve lever 21, so the pivots 45 and 46 that connects the fixed link 41 with the movable link 42 are pushed in the arrow B1 direction (upwards) in the drawing. This causes the fixed link 41 and the movable link 42 to be positioned so that they lie continuous to the parking rod 33 in a straight line as shown in FIGS. 3 and 10A.

When the fixed link 41 and the movable link 42 lie continuous to the parking rod 33 in a straight line, the distance between the one end of the fixed link 41 to the other end of the movable link 42 is at a maximum, which means that the parking rod 33 is pushed to the maximum in the arrow C1 direction (rearwards) in the drawing. The parking lock pole 32 is thus pushed up by the taper cone 34, bringing the parking gear 31 into a non-rotatable locked state.

On the other hand, when the shift lever 10 is moved from the parking range P to the reverse range R, as shown in FIG. 4, the shift control shaft 22 and the manual valve lever 21 are tilted in the arrow A2 direction (clockwise direction) in the drawing by the actuator 23. The pin 24a of the latch lever 24 is thus engaged with the reverse position groove of the manual valve lever 21.

Figure 10B:
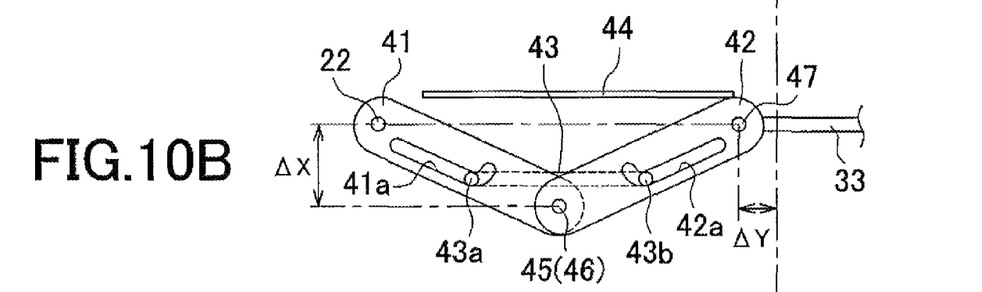
FIG. 10B shows operation for a reverse range R.

Simultaneously, the fixed link 41 is tilted in the same direction together with the tilting movement of the manual valve lever 21, so the pivots 45 and 46 that connect the fixed link 41 with the movable link 42 are pulled in the arrow B2 direction (downwards) in the drawing. This causes the fixed link and the movable link 42 to be positioned so that they are bent in a V-shape as shown in FIGS. 4 and 10B.

In this state, the distance between the one end of the fixed link 41 to the other end of the movable link 42 decreases, which means that the parking rod 33 is pulled by a predetermined distance in the arrow C2 direction (forwards) in the drawing. The parking lock pole 32 is thus lowered by the taper cone 34, bringing the parking gear 31 into a rotatable unlocked state.

Figure 10C:
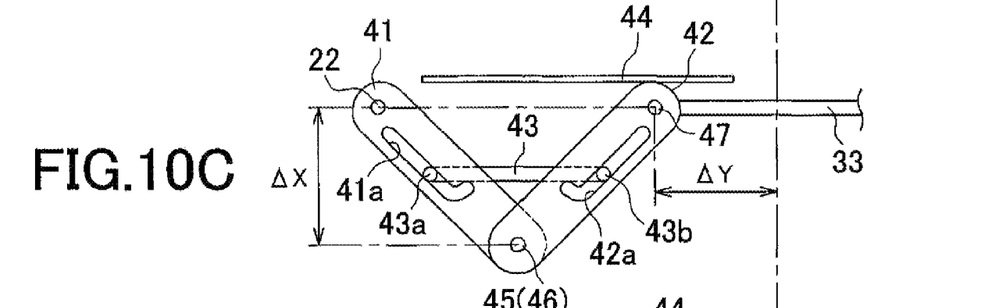
FIG. 10C shows operation for a neutral range N.
Figure 10D:
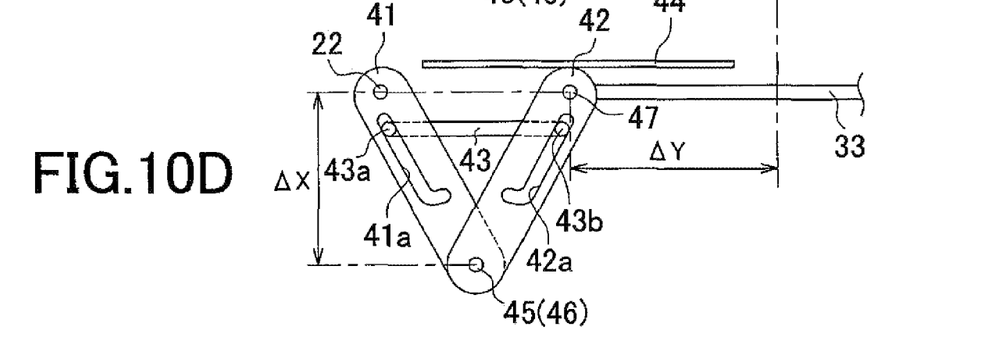
FIG. 10D shows operation for a drive range D.

In addition, when the shift lever 10 shifts into the neutral range N and when the shift lever 10 shifts into the drive range D, as shown in FIGS. 10C and 10D, respectively, the angle formed between the fixed link 41 and the movable link 42, which are bent in a V-shape, progressively decreases, and the stroke that pulls the parking rod 33 forwards increases.

Figure 12:
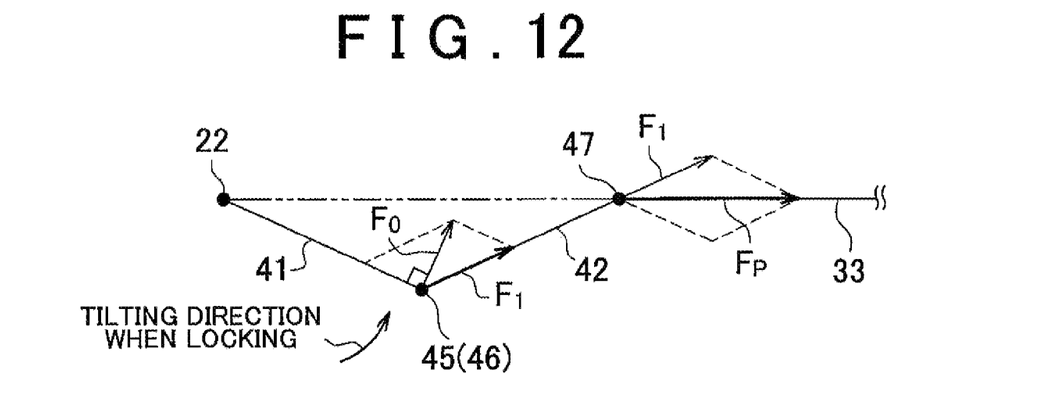
FIG. 12 is a skeleton diagram illustrating the relationship between the driving force and the pressing force at the time of locking in the booster mechanism shown in FIGS. 3 to 9.
Figure 13:
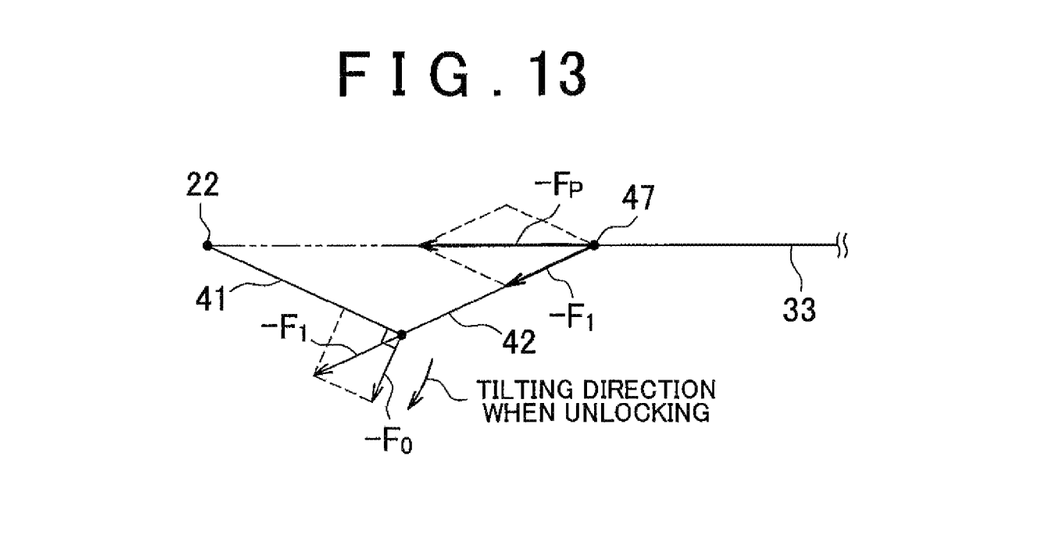
FIG. 13 is a skeleton diagram illustrating the relationship between the driving force and the pulling force at the time of unlocking in the booster mechanism shown in FIGS. 3 to 9.

Next, in connection with the operation of the parking lock device 30 as described above, the advantage of providing the booster mechanism 40 will be described with reference to FIGS. 12 and 13.

First, the relationship between the driving force of the manual valve lever 21 and the pressing force on the parking rod 33 in the above-described locked state will be described with reference to FIG. 12.

When the manual valve lever 21 is tilted counterclockwise in the drawing, a tangential force $F_0$ (equivalent to a driving force) acts on the pivots 45 and 46 that connect the fixed link 41 with the movable link 42. The tangential force $F_0$ is increased by the boosting action of the booster mechanism 40, thereby generating a pressing force $F_p$ at the pivot 47 that connects the movable link 42 to the parking rod 33. Here, $F_1$ denotes a component force of the tangential force $F_0$.

In this way, when locking the parking lock device 30, a very large pressing force $F_0$ is obtained with respect to the parking rod 33 by means of a small tangential force $F_0$, that is, by means of a small driving force of the manual valve lever 21.

Further, the relationship between the driving force of the manual valve lever 21 and the pressing force on the parking rod 33 in the above-described unlocked state will be described with reference to FIG. 13.

When the manual valve lever 21 is tilted clockwise in the drawing, a tangential force $-F_0$ (equivalent to a driving force) directed opposite to that mentioned above acts on the pivots 45 and 46 that connect the fixed link 41 with the movable link 42. The tangential force $-F_0$ is increased by the boosting action of the booster mechanism 40, which generates a pulling force $-F_p$ at the pivot 47 that connects the movable link 42 to the parking rod 33. It should be noted that $-F_1$ denotes a component force of the tangential force $-F_0$.

In this way, when unlocking the parking lock device 30, a very large pulling force $-F_p$ may be obtained with respect to the parking rod 33 by means of a small tangential force $-F_0$, that is, by means of a small driving force of the manual valve lever 21.

In the boosting mechanism 40, when unlocking from a locked state, in which the fixed link 41 and the movable link 42 are aligned in a straight line as shown in FIG. 10A, by bending the links 41 and 42 in a V-shape as shown in FIGS. 10B to 10D, and when locking from an unlocked state conversely, the displacement $\Delta X$ of the pivots 45 and 46 and the displacement $\Delta Y$ of the pivot 47 can be determined by the following equation.

$$\Delta X=(Y/2)\sin\theta \text{ and } \Delta Y=Y-2\times[(Y/2)\cos\theta]=Y(1-\cos\theta)$$

In the above equation, Y is the distance from the center of the shift control shaft 22 to the center of the pivot 47 in the booster mechanism 40, and $\theta$ is the angle formed by the links 41 and 42 when bent in a V-shape.

Figure 14:
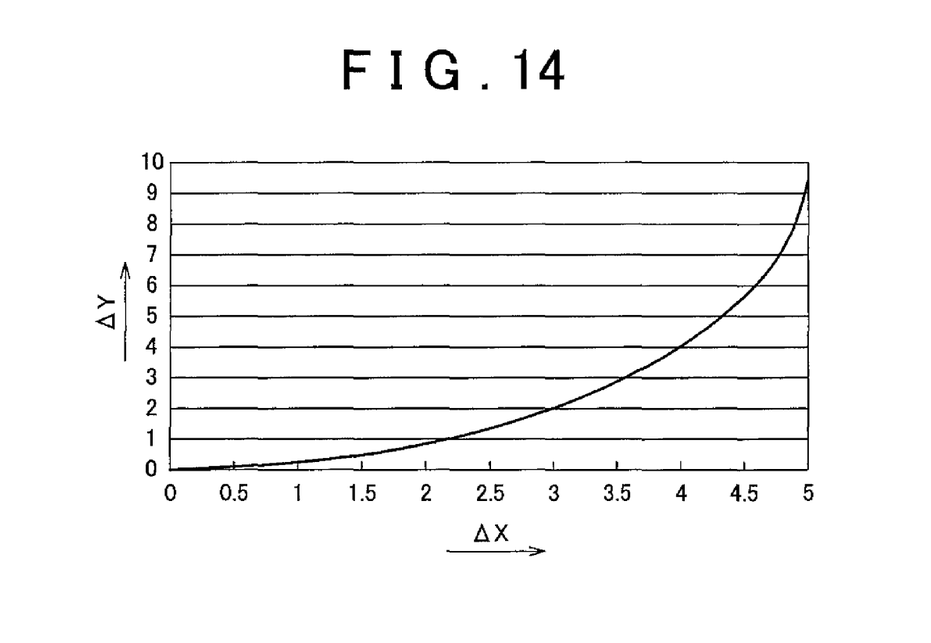
FIG. 14 is a graph showing the relationship between displacements ΔX and ΔY shown in FIGS. 10A to 10D.

For reference, the relationship between $\Delta X$ and $\Delta Y$ when Y is set as, for example, "10" is indicated by the graph of FIG. 14. Also, on the basis of the data shown in FIG. 14, the relationship between the angle $\theta$ of bend, and the amplification factor of the pressing force or pulling force on the parking rod 33 is shown in the graph of FIG. 15.

Figure 15:
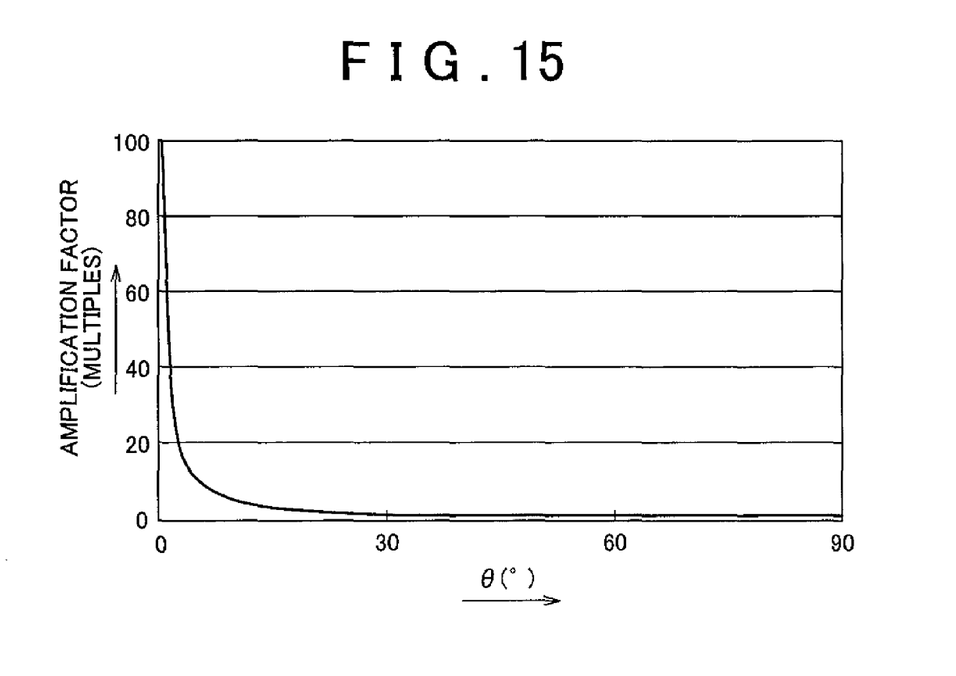
FIG. 15 is a graph showing the relationship between the angle θ formed between a fixed link and a movable link when bent as shown in FIGS. 10A to 10D and the magnification factor of a pressing force or pulling force on a parking rod.

As is apparent from the graphs of FIGS. 14 and 15, by using the booster mechanism 40 described above, the force with which the pivots 45 and 46 are pulled in the $\Delta X$ direction with the manual valve lever 21 in order to unlock the parking lock device 30 is amplified by a factor of several tens to several hundreds as the force pulling the parking rod 33 in the $\Delta Y$ direction in early stages.

In addition, for reference, the case where the vehicle is stopped on a slope will be described.

As described above with reference to the related art, as a general tendency, when a vehicle is stopped on a downhill slope, the same forward rotation torque as that at the time of forward movement is input to the output shaft 7 from the driving wheels, whereas when the vehicle is stopped on an uphill slope, a reverse rotation torque is input to the output shaft 7 from the driving wheels.

In the parking lock device 30 illustrated in this embodiment, if, for example, the above-mentioned forward rotation torque is input to the output shaft 7 while the parking lock device 30 locked, the pawl 32a of the parking lock pole 32 is prone to disengage from the parking gear 31. Accordingly, as shown in FIG. 11, the axial load Fa directed to the unlocking side acts on the parking rod 33.

At this time, the moments M1 and M2 respectively act on the links 41 and 42 of the booster mechanism 40 to move the pivoted portions (45 and 46) of the links 41 and 42 to the stopper 44 side, thereby keeping the links 41 and 42 aligned in a straight line as it is and preventing the links 41 and 42 from bending to the unlocking side. The parking lock device 30 remains locked.

On the other hand, if the above-mentioned reverse rotation torque is input to the output shaft 7 while the parking lock device 30 is locked, the pawl 32a of the parking lock pole 32 engages the parking gear 31.

Accordingly, a relatively large driving force of the manual valve lever 21 is required to unlock the parking lock device 30. At this time, according to this embodiment, when shifting to an unlocked state, the driving force of the manual valve lever 21 is increased by the boosting action of the booster mechanism 40 as appropriate to act as a pulling force on the parking rod 33, so that the parking rod 33 is pulled strongly even when the driving force of the manual valve lever 21 is small. The pawl 32a of the parking lock pole 32 may be thus disengaged from the parking gear 31.

As described above, in the parking lock device 30 according to the embodiment to which the features of the present invention are applied, the manual valve lever 21 is connected to the parking rod 33 via the booster mechanism 40. It is thus possible to increase the pressing force or pulling force on the parking rod 33 even when the driving force applied by the manual valve lever 21 when shifting to a locked state or unlocked state is small.

Accordingly, the parking lock device 30 can be easily and reliably locked or unlocked with a relatively small force.

Therefore, the driving force to be applied by the manual valve lever 21 when locking the parking lock device or unlocking the parking lock device from an unlocked state can be made small.

Furthermore, in this embodiment, the booster mechanism 40 adopts a relatively simple configuration of a toggle joint type using the plurality of links 41 and 42 and the like, which proves advantageous in reducing equipment cost as compared with a case where power assist means such as an expensive motor is equipped as described above with reference to the related art.

It is to be understood that the present invention is not limited to the above-described embodiment, but covers all such modifications and applications as fall within the scope of the claims and their equivalents. Hereinafter, other embodiments of the present invention will be exemplified.

(1) While the above-mentioned embodiment is directed to the parking lock device 30 equipped in a front-engine, rear-drive (FR) automatic transmission, this can also be a parking lock device equipped in a front-engine, front-drive (FF) automatic transmission.

(2) While in the above-mentioned embodiment the manual valve lever 21 of the range selector 20 is used as the drive lever for driving the parking rod 33 of the parking rod device 30, this may be another independent drive lever.

(3) While the above-mentioned embodiment is directed to the case where the manual valve lever 21 of the range selector 20 is driven by the manual actuator 23, this may be of a type in which, as in the related art, the manual valve lever 21 and the shift lever 10 are mechanically connected together by a power transmission member such as a shift rod or a shift cable, and the manual valve lever 21 is driven by the operating force on the shift lever 10 applied by the driver.

(4) The booster mechanism 40 described in the above-mentioned embodiment can also adopt a configuration in which the fixed link 41 is omitted, and the fixed link 41 is substituted for by the manual valve lever 21 itself.

In that case, it is necessary to provide the elongated guide hole 41a of the fixed link 41 in the manual valve lever 21.

(5) The booster mechanism 40 described in the above-mentioned embodiment can also adopt a configuration in which the connecting bar 43 is omitted.

What is claimed is:

1. A parking lock device which brings an output shaft of an automatic transmission into a non-rotatable locked state or a rotatable unlocked state as required, the parking lock device comprising:
a parking gear externally fixed to the output shaft;
a parking lock pole displaced between a lock position, where the parking lock pole approaches and latches onto the parking gear thereby disabling rotation of the parking gear, and an unlock position, where the parking lock pole separates and disengages from the parking gear thereby enabling rotation of the parking gear;
a parking rod that is pushed and pulled to displace the parking lock pole toward or away from the parking gear;

a drive lever, supported in a tiltable manner, that pushes and pulls the parking rod in a longitudinal direction of the parking rod; and a booster mechanism, interposed between the parking rod and the drive lever, that increases a driving force of the drive lever applied when locking or unlocking the parking lock device and converts the driving force into a pressing force or a pulling force on the parking rod, wherein the booster mechanism comprises:

a fixed link, attached at both ends to a tilting axis and a position separated from the tilting axis in the drive lever;

a movable link which is pivoted on the position in the driver lever separated from the tilting axis and on one end of the parking rod, wherein when the fixed link is tilted to the locking side integrally with the drive lever, the moveable link is positioned so that the movable link is aligned in a straight line with the parking rod and pushes the parking rod in a manner of a strut, and when the fixed link is tilted to the unlocking side integrally with the drive lever, the moveable link is positioned so that the movable link is inclined at a predetermined angle with respect to the parking rod and pulls the parking rod;

a connecting bar having two ends, wherein each end engages an elongated guide hole provided in the fixed link and the movable link, respectively, so as to extend between their both end; and a stopper that prevents the fixed link and the movable link from bending opposite to an unlocking side in a state when the fixed link and the movable link are aligned in a straight line with the parking rod.

2. The parking lock device according to claim 1, wherein the ends of the elongated guide hole provided in the fixed link and of the elongated guide hole provided in the movable link which are located on a side close to each other are extended so as to be offset to a side opposite to the unlocking side with respect to each of the centerlines of the fixed link and movable link that extends continuously in a single line in the state when the fixed link, the movable link, and the parking rod are aligned in a straight line.

* * * * *